BEST AVAILABLE COPY

Jan. 31, 1928.

Re. 16,865

L. R. SMITH

OIL REFINING STILL AND METHOD OF MAKING THE SAME BY ELECTRIC WELDING

Original Filed Dec. 31. 1924

INVENTOR.
L. R. SMITH

WITNESS:
Floyd Palm
DEL.

BY
Ervin, Wheeler & Woodard
ATTORNEYS.

Reissued Jan. 31, 1928. Re. 16,865

UNITED STATES PATENT OFFICE.

LLOYD RAYMOND SMITH, OF MILWAUKEE, WISCONSIN, ASSIGNOR TO A. O. SMITH CORPORATION, OF MILWAUKEE, WISCONSIN, A CORPORATION OF NEW YORK.

OIL-REFINING STILL AND METHOD OF MAKING THE SAME BY ELECTRIC WELDING.

Original No. 1,577,410, dated March 16, 1926, Serial No. 758,994, filed December 31, 1924. Application for reissue filed November 26, 1927. Serial No. 235,989.

The present invention relates to stills employed in refining crude oils, and to a method by the practice of the steps of which it is now rendered possible to construct stills embodying the invention in its concrete form.

In the treatment of oils of the nature specified, many adverse conditions are encountered which can be but partially overcome in such apparatus as it has been possible to construct in accordance with previously known methods. This situation is due to what have been regarded and accepted heretofore as insurmountable physical limitations imposed upon the erection of such apparatus. Such limitations have acted with a forbidding restraint upon the construction of apparatus of surpassingly large dimensions, and have served necessarily to limit the construction of the apparatus to such dimensions as could be produced by the practice of known methods of manufacture, subject always to the further and equally effective limitations upon the capacity and power of existing mechanical devices to produce such apparatus.

In the refining of crude oils, it is recognized that superior results are attained where the volume of oil in the course of distillation is large; in fact, the larger the quantity of oil undergoing treatment, the better the quality, so far as results are concerned. Hence, the demand for stills of enormous size. And in order to permit quantity treatment, stills of comparatively large but yet limited constructional dimensions have been erected, subject, however, to the physical restraints hereinbefore referred to, so that it has not been possible heretofore to construct stills above certain dimensions.

Stills used in this art are subject to deteriorating influences, which in the course of a comparatively short time render them unserviceable. The corrosive elements constantly at work upon the inside of the still, together with the very high internal pressures, and the high external temperatures, are factors which contribute to the destruction of the still. It is therefore essential that the stills be constructed as substantially as possible in order to prolong the period of their serviceability to the fullest extent.

In making stills as heretofore, the several slabs selected for conversion into the curved plates of which the still is formed, have been limited to a thickness of about one and one-half inches, by reason of the impossibility and uncertainty of welding satisfactorily any plates of greater thickness. The system of welding heretofore used in the manufacture of these stills, is the hammer or forge method, with its limitations. But the practice of this known method is exceedingly difficult, as well as very expensive, and carries with it no assurance that the welded joint is perfect. The defects, however, do not manifest themselves until after the completed still has been put into use, and leaks in the welded joints appear. When so manifested, the development of the defect is often fatal to the still, for it is then sometimes beyond correction. Consequently, the period of serviceability of the still is shortened, and great financial loss is involved in the failure to receive from the still the degree of service for which it was constructed.

But by my improved method of manufacturing, a still is produced which it is assured at the start is entirely free from constructional defects, and I am enabled to use plates of a thickness of two and one-half inches, or more, in the construction thereof, thus greatly prolonging the life of the still. It is proposed by me to construct stills having a length of at least forty feet and a diameter of from four to seven feet, or more, at the same time produce a still as an integral structure wholly free from seams or joints, of such nature as have constituted objections in prior structures.

In carrying out my method, I take mill slabs of a length of forty feet, and convert them into longitudinal troughs, the radius upon which the troughs are formed being computed upon the diameter of the still. The plates so curved to form trough-like sections are assembled in the required number to form a symmetrical tubular structure having a length of forty feet, and the several sections are then by an electric arc fused along their meeting edges into an integral structure. In the practice of arc welding, successive layers of welding metal flowing from a fusible weldrod are deposited in the previously prepared welding groove, so that thorough amalgamation of the metals takes place and an integral structure free from any joints is assured.

The heads for the still, which may be as shown or may be drawn from slabs of slightly thicker gauge, are fused to the ends of the tubular structure after the same manner of preparation and fusion of the meeting edges, so that a single, integral structure is produced.

Having thus outlined the difficulties of the prior art, and the manner in which such difficulties are overcome and eliminated by my invention, I will now more particularly describe the latter, and point out the novelty thereof in the appended claims.

In the construction of stills of the present type, it has not heretofore been possible to avoid circumferential seams or welds upon the still at points intermediate its ends, where the edges of the plates are joined, as well as longitudinal seams or welds where the ends of the plates are joined. All of such joints produced by the practice of the known methods of construction are potentially weak and liable to open under the action of the acids in the tank, aided by the high internal pressures to which the tank is subjected and the very high temperatures required for distillation. Especially, does a serious weakness develop at the intersection of a circumferential weld and a longitudinal weld, due to the practical impossibility of effecting a perfect weld at such points by known methods of forge welding. Lapped seams are not to be tolerated in the zone in which heat is applied to the still, and so these have been discarded, for this and the further reason that such seams would introduce objectionable irregularities upon the inside surface of the still, which latter is required to have a smooth and unbroken contour upon its interior.

In carrying out my invention in the production of a still having a length of, say, forty feet, I take a number of flat slabs of that length and of suitable uniform width and thickness; the latter may be two and one-half inches or more. These slabs are pressed or otherwise formed into longitudinal trough-like sections 10, the cross sectional curve or arc of which is computed upon the diameter of the still, so that when such sections in the required number are assembled with their edges registering, in circular order, a perfect cylinder of uniform diameter will be produced. By means of an electric arc, I fuse and unite the meeting edges of the sections into an integral tubular structure of unusual proportions. The width of the plates is but nominal when compared with their length, so that such length is many times such width.

Figure 1:
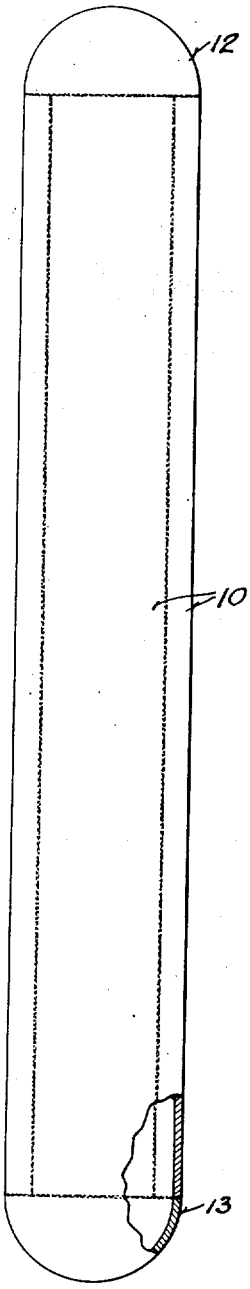
Figure 1 is a view in elevation of a still constructed in accordance with my invention, the view at one end being partially broken out to show the arrangement of component parts of the still.
Figure 2:
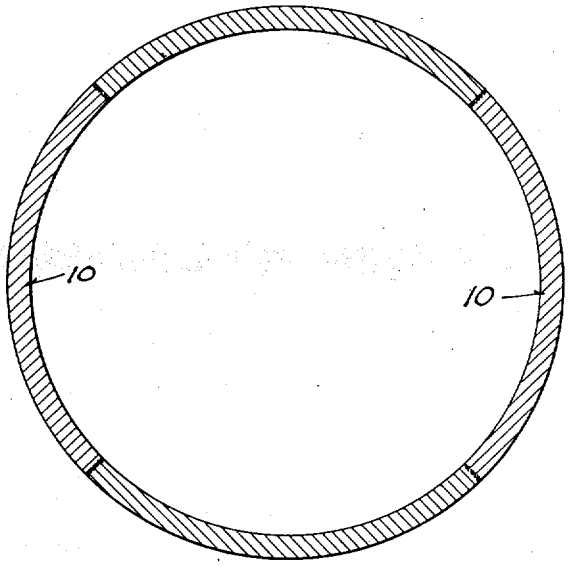
Fig. 2 is a sectional view on a transverse line through the still showing the arrangement of the trough-like sections in a construction in which plates are embodied.
Figure 3:
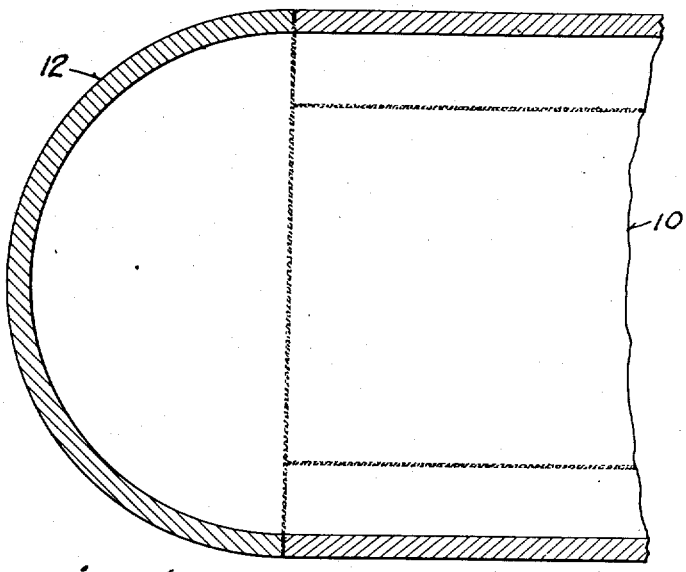
Fig. 3 is a longitudinal sectional central view through one end of the still showing the arrangement of the heads thereof.
Figure 4:
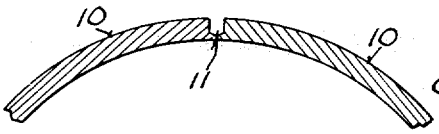
Fig. 4 is a transverse sectional view, similar to Fig. 2, showing the formation of one type of welding groove at the meeting line of the edges of the plates so as to facilitate the fusing operations by which the integral structure is produced.

On account of the thickness of the metal, and the impossibility of the welding arc penetrating and fusing the same in a commensurate degree for its entire depth, I provide in the line of the meeting edges of the longitudinally curved plate, a welding groove 11, which may, for instance, have the form indicated in Fig. 4. Such groove may be produced conveniently by machining away the outer corners of the plates so as to produce a U-shaped groove, at the bottom of which the metal is so reduced in thickness as to be readily penetrated and fused for its entire depth by the electric arc when the latter is applied thereto.

As a means for conducting the electric current, I prefer to use a destructible metallic weldrod which is fused in the ratio of its feeding movement toward the work. The molten metal flowing from the meldrod is deposited in the groove, such molten metal uniting with the fused metal of the side walls thereof, so that in the longitudinal as well as in the lateral traverse of the weldrod in the groove, the latter becomes filled with a succession of layers of welding metal, and a homogeneous fused structure is produced, which will be found to possess a tensile strength which in any region is not less than that of the metal of which the tubular structure is formed. This result is due to the complete amalgamation of the successive layers of welding metal with the fused metal at the sides of the groove and with each other.

Heads 12 and 13 are drawn from circular discs or slabs having the same or a slightly increased thickness over that of the plates 10, and to equalize the internal pressures, the said heads may be hemi-spherical, and drawn upon a radius based upon the diameter of the still, but these features of construction may be varied. The heads are fused to the tubular member in the manner previously described, a welding groove as before being duly formed in the meeting line of the ends of the cylinder and the rims of the heads.

I prefer to use covered weldrods as conductors for the arcing current, by reason of certain inhering advantages now well known in the metallic-arc welding art, and with a view to economizing in the consumption of such weldrods, I may place in the welding groove slugs or rods of metal which will be fused by the arc, and thus supply a portion of the additional welding metal required for filling the groove and uniting the parts.

The neck pieces or flanged pipe connections at the several openings in the still are attached at the outside by the same manner of preparation and by arc welding, so that the interior surface of the still is entirely smooth and free from any irregularities or projections which would interfere with the agitators and scrapers.

Having thus described my invention, what I claim and desire to secure by Letters Patent of the United States, is:

1. A still for use in refining oils, comprising a plurality of thick plates of extreme length curved transversely and assembled edge to edge to constitute a tubular structure, the sections being fused together in the longitudinal meeting line of their edges by an electric arc to form an integral tubular structure without circumferential joints.

2. A still for use in refining oils, comprising a plurality of thick plates of extreme length curved transversely and assembled edge to edge in circular order to constitute a tubular structure, the sections being fused together in the line of their longitudinal meeting edges by an electric arc, to form an integral tubular structure having a smooth and symmetrical interior and without circumferential joints.

3. A still for use in refining oils, comprising a plurality of thick plates of extreme length and of uniform width curved transversely and assembled edge to edge to constitute a tubular structure, the sections being fused together in the line of their longitudinal meeting edges by an electric arc, to form an integral tubular structure of uniform diameter and without circumferential seams in its length.

4. A still for use in refining oils, comprising a plurality of thick plates having a length many times their width curved transversely and assembled edge to edge to constitute a tubular structure of uniform diameter, the sections being fused together at the meeting line of their edges by an electric arc into an integral tubular structure without circumferential joints, and with additional welding material fused into the structure at the meeting lines.

5. A still for use in refining oils, composed of a plurality of transversely curved thick plates of extreme length assembled with their longitudinal edges in register to create a tubular structure having a smooth interior, the said plates being fused at such meeting line by an electric arc to form an integral tubular structure without circumferential joints in its length, and heads fused to the ends of the tubular member by an electric arc to constitute the whole as an integral structure.

6. In the manufacture of stills of extreme dimensions for use in oil distillation, the method which comprises the steps of forming thick plates of great length into longitudinal trough-like sections, assembling a plurality of such sections in circular order with their edges in register, and fusing such sections in the meeting line of their edges by an electric arc to constitute an integral tubular structure without circumferential joints.

7. In the manufacture of stills of extreme dimensions for use in oil distillation, the method which comprises the steps of converting thick plates having a length many times their width into longitudinal trough-like sections with edges reduced in thickness to form a welding groove, assembling such sections in circular order with their edges in register, and fusing the said edges by playing an electric arc in the welding groove to constitute an integral tubular structure without circumferential joints.

8. In the manufacture of stills of extreme dimensions for use in oil distillation, the method which comprises the steps of converting thick plates having a length many times their width into longitudinal trough-like sections with edges reduced in thickness to form a welding groove, assembling such sections in circular order with their edges in register, and fusing the said edges by playing an electric arc in the welding groove and filling the welding groove with welding metal to constitute an integral tubular structure without circumferential joints.

9. In the manufacture of stills of extreme dimensions for use in oil distillation, the method which comprises the steps of converting thick plates having a length many times their width into longitudinal trough-like sections with edges reduced in thickness to form a welding groove, assembling such sections in circular order with their edges in register, conducting an arcing current by means of a fusible weldrod to fuse the said edges and filling the groove with molten metal flowing from the weldrod to constitute an integral tubular structure without circumferential joints.

10. In the manufacture of stills of extreme dimensions for use in oil distillation, the method which comprises the steps of converting thick metal plates of great length into longitudinal trough-like sections, assembling such sections in circular order with their edges in registry, fusing such sections in the meeting line of their edges by an electric arc to form a tubular member without circumferential joints, and fusing heads to the ends of the tubular member to complete the structure and constitute the whole as an integral structure.

11. In the manufacture of stills of extreme dimensions for use in oil distillation, the method which comprises the steps of converting thick metal plates of great length into longitudinal trough-like sections with edges reduced in thickness to form a welding groove, assembling the sections with their edges in registry, fusing the sections together at the meeting line of the edges and filling the groove with welding metal to form a tubular member without circumferential joints, and fusing heads to the ends of the tubular member by an electric arc to complete and constitute the whole as an integral structure.

12. A still for use in refining oils, embodying a plurality of metal plates of extreme thickness and length curved transversely and assembled edge to edge in circular order, the said trick metal plates being welded together on their longitudinal meeting lines by an electric current into a tubular structure without circumferential joints in the length thereof.

13. A still for use in refining oils, comprising a plurality of metal plates of extreme thickness and length curved transversely and assembled edge to edge in circular order, the said thick metal plates being welded together on their longitudinal meeting lines by an electric current into a tubular structure without circumferential joints in the length thereof, and heads fused and welded to the ends of the tubular structure to complete the closure.

14. In the manufacture of stills of extreme dimensions for use in refining oil, the method which comprises the steps of converting metal plates of extreme thickness and great length into longitudinal trough-like sections, assembling a plurality of such sections in circular order with their longitudinal edges in register, and heating and welding the said sections in their meeting lines by an electric current to constitute an integral tubular structure without circumferential joints in the length thereof.

15. In the manufacture of stills of extreme dimensions for use in refining oil, the method which comprises the steps of converting metal plates of extreme thickness and great length into longitudinal trough-like sections, assembling a plurality of such sections in circular order with their longitudinal edges in register, and heating and welding the said sections in their meeting lines by an electric current to constitute an integral tubular structure without circumferential joints in the length thereof, forming heads of substantially like diameter and thickness, arranging such heads one at each end of the tubular structure, and fusing and welding the parts in their meeting lines by an electric current to complete the closure.

16. In the manufacture of stills of extreme dimensions for use in refining oil, the method which comprises the steps of forming a tubular body of metal of excessive thickness and great length, forming a concaved head of substantially like diameter and thickness of metal, arranging the heads one at each end of the tubular body, heating the parts in their meeting lines by an electrical current, and welding them into an integral structure to complete the closure.

In testimony whereof, I have signed my name at Milwaukee, this 25th day of November, 1927.

L. R. SMITH.

CERTIFICATE OF CORRECTION.

Reissue Patent No. 16,865. Granted January 31, 1928, to

LLOYD RAYMOND SMITH.

It is hereby certified that error appears in the printed specification of the above numbered patent requiring correction as follows: Page 2, line 102, for the word "meldrod" read "weldrod"; page 4, line 26, claim 12, for the word "trick" read "thick"; and that the said Letters Patent should be read with these corrections therein that the same may conform to the record of the case in the Patent Office.

Signed and sealed this 6th day of March, A. D. 1928.

M. J. Moore,
Acting Commissioner of Patents.

Seal.

in the meeting line of their edges by an electric arc to form a tubular member without circumferential joints, and fusing heads to the ends of the tubular member to complete the structure and constitute the whole as an integral structure.

11. In the manufacture of stills of extreme dimensions for use in oil distillation, the method which comprises the steps of converting thick metal plates of great length into longitudinal trough-like sections with edges reduced in thickness to form a welding groove, assembling the sections with their edges in registry, fusing the sections together at the meeting line of the edges and filling the groove with welding metal to form a tubular member without circumferential joints, and fusing heads to the ends of the tubular member by an electric arc to complete and constitute the whole as an integral structure.

12. A still for use in refining oils, embodying a plurality of metal plates of extreme thickness and length curved transversely and assembled edge to edge in circular order, the said trick metal plates being welded together on their longitudinal meeting lines by an electric current into a tubular structure without circumferential joints in the length thereof.

13. A still for use in refining oils, comprising a plurality of metal plates of extreme thickness and length curved transversely and assembled edge to edge in circular order, the said thick metal plates being welded together on their longitudinal meeting lines by an electric current into a tubular structure without circumferential joints in the length thereof, and heads fused and welded to the ends of the tubular structure to complete the closure.

14. In the manufacture of stills of extreme dimensions for use in refining oil, the method which comprises the steps of converting metal plates of extreme thickness and great length into longitudinal trough-like sections, assembling a plurality of such sections in circular order with their longitudinal edges in register, and heating and welding the said sections in their meeting lines by an electric current to constitute an integral tubular structure without circumferential joints in the length thereof.

15. In the manufacture of stills of extreme dimensions for use in refining oil, the method which comprises the steps of converting metal plates of extreme thickness and great length into longitudinal trough-like sections, assembling a plurality of such sections in circular order with their longitudinal edges in register, and heating and welding the said sections in their meeting lines by an electric current to constitute an integral tubular structure without circumferential joints in the length thereof, forming heads of substantially like diameter and thickness, arranging such heads one at each end of the tubular structure, and fusing and welding the parts in their meeting lines by an electric current to complete the closure.

16. In the manufacture of stills of extreme dimensions for use in refining oil, the method which comprises the steps of forming a tubular body of metal of excessive thickness and great length, forming a concaved head of substantially like diameter and thickness of metal, arranging the heads one at each end of the tubular body, heating the parts in their meeting lines by an electrical current, and welding them into an integral structure to complete the closure.

In testimony whereof, I have signed my name at Milwaukee, this 25th day of November, 1927.

L. R. SMITH.

CERTIFICATE OF CORRECTION.

Reissue Patent No. 16,865. Granted January 31, 1928, to

LLOYD RAYMOND SMITH.

It is hereby certified that error appears in the printed specification of the above numbered patent requiring correction as follows: Page 2, line 102, for the word "meldrod" read "weldrod"; page 4, line 26, claim 12, for the word "trick" read "thick"; and that the said Letters Patent should be read with these corrections therein that the same may conform to the record of the case in the Patent Office.

Signed and sealed this 6th day of March, A. D. 1928.

M. J. Moore,
Acting Commissioner of Patents.

Seal.